United States Patent
Girondi

(10) Patent No.: US 10,213,713 B2
(45) Date of Patent: Feb. 26, 2019

(54) FILTER CARTRIDGE PROVIDED WITH MEANS FOR DRAINING WATER AND A RELATIVE FILTER GROUP

(71) Applicant: UFI FILTERS S.P.A., Porto Mantovano (MN) (IT)

(72) Inventor: Giorgio Girondi, Mantova (IT)

(73) Assignee: UFI FILTERS S.P.A., Porto Mantovano (MN) (IT)

(*) Notice: Subject to any disclaimer, the term of this patent is extended or adjusted under 35 U.S.C. 154(b) by 27 days.

(21) Appl. No.: 15/531,832

(22) PCT Filed: Nov. 6, 2015

(86) PCT No.: PCT/IB2015/002116
§ 371 (c)(1),
(2) Date: May 31, 2017

(87) PCT Pub. No.: WO2016/087916
PCT Pub. Date: Jun. 9, 2016

(65) Prior Publication Data
US 2017/0312664 A1 Nov. 2, 2017

(30) Foreign Application Priority Data
Dec. 1, 2014 (IT) .............................. RE2014A0099

(51) Int. Cl.
*B01D 36/00* (2006.01)
*B01D 29/58* (2006.01)
(Continued)

(52) U.S. Cl.
CPC ......... *B01D 35/1576* (2013.01); *B01D 29/15* (2013.01); *B01D 29/58* (2013.01);
(Continued)

(58) Field of Classification Search
CPC .. B01D 35/1576; B01D 35/005; B01D 29/15; B01D 29/58; B01D 36/006;
(Continued)

(56) References Cited

U.S. PATENT DOCUMENTS 6,113,781 A    9/2000  Popoff et al.

FOREIGN PATENT DOCUMENTS

WO         9722394 A1    6/1997
WO      2013038252 A1    3/2013
(Continued)

*Primary Examiner* — Madeline Gonzalez
(74) *Attorney, Agent, or Firm* — Volpe and Koenig, P.C.

(57) ABSTRACT

A filter cartridge for filtering fuel comprising a filter wall having a tubular conformation, a first support plate fixed to an end of the filter wall and a second support plate fixed to the opposite end of the filter wall, a support core coaxially inserted internally of the filter wall and provided with radial openings for passage of the fuel, in which the support core exhibits, at an upper end thereof, a housing seating of a hydrophobic wall having a tubular shape which is positioned coaxially internally of the core, the hydrophobic wall comprising a support shank, configured such as to be housed in the housing seating and provided with at least a portion of a bypass conduit which enables placing an internal volume of the filter wall in fluid communication with an outlet hole of the cartridge.

12 Claims, 5 Drawing Sheets

(51) Int. Cl.
    *B01D 29/15*     (2006.01)
    *B01D 35/00*     (2006.01)
    *B01D 35/157*     (2006.01)

(52) U.S. Cl.
    CPC ......... *B01D 35/005* (2013.01); *B01D 36/006* (2013.01); *B01D 2201/0415* (2013.01); *B01D 2201/0453* (2013.01); *B01D 2201/291* (2013.01); *B01D 2201/295* (2013.01)

(58) Field of Classification Search
    CPC .... B01D 2201/0453; B01D 2201/0415; B01D 2201/291; B01D 2201/295
    USPC ........ 210/130, 433.1, DIG. 5, 440–444, 315, 210/338, 342
    See application file for complete search history.

(56) References Cited

FOREIGN PATENT DOCUMENTS

| | | | |
|---|---|---|---|
| WO | 2014057323 A | 4/2014 | |
| WO | WO-2014057323 A1 * | 4/2014 | ........... B01D 36/006 |

\* cited by examiner

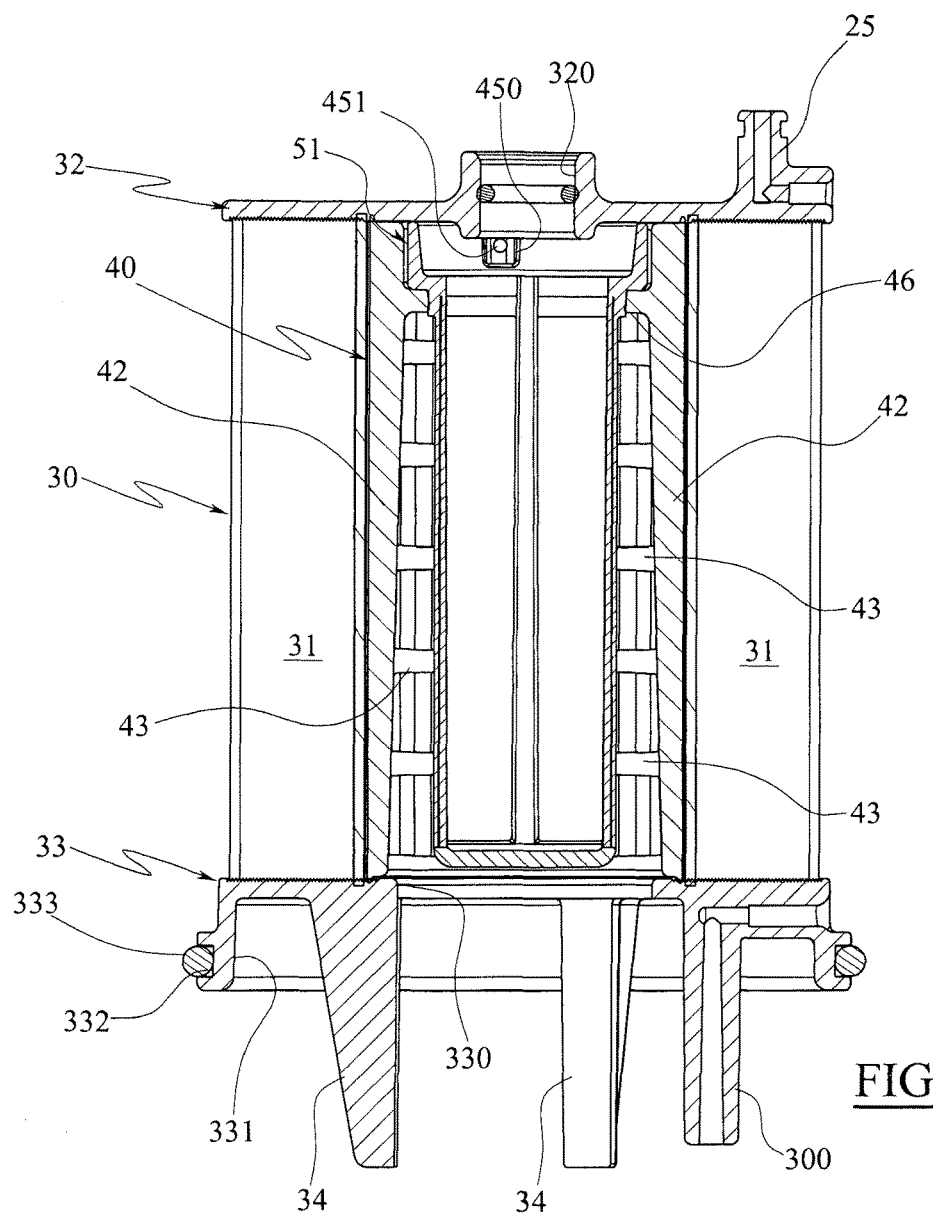
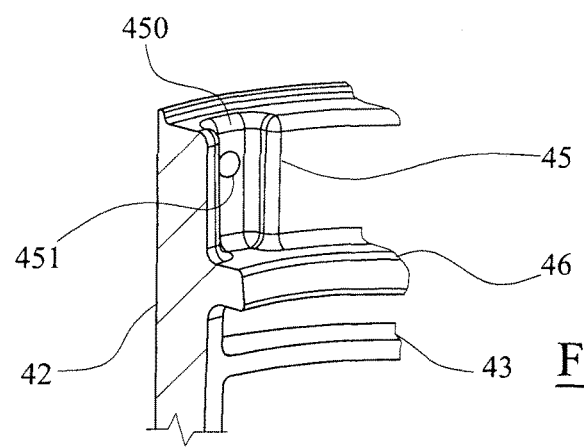

FILTER CARTRIDGE PROVIDED WITH MEANS FOR DRAINING WATER AND A RELATIVE FILTER GROUP

TECHNICAL FIELD

The present invention relates to a filter cartridge and the relative filter group for filtering fluids.

In general, the invention relates to a filter cartridge and the relative filter group, provided with means for separating and draining the water present in the fluids to be filtered and, more in particular, relating to the motor vehicle sector for filtering fuel, i.e. diesel fuel.

PRIOR ART

As is known, the filtering of fuel in the motor vehicle field is generally obtained by means of a filter group which comprises an external casing provided with a body having a substantially beaker-conformed body, the open end of which is closed by a cover provided with an inlet of the liquid to be filtered and an outlet of the filtered liquid; at least a filter cartridge is contained internally of the casing, able to subdivide the internal volume of the casing into two distinct chambers, of which a first chamber communicating with the inlet and a second chamber communicating with the outlet.

In this way, the fuel flowing from the inlet towards the outlet of the filter group is forced to cross the filter wall which retains the impurities that might be present therein.

A typical filter cartridge comprises a filter wall having a tubular shape, for example a pleated filter wall or a depth wall, and two support plates which are fixed to the opposite ends of the filter wall.

With the aim of guaranteeing a greater rigidity and mechanical resistance to the filter wall, the cartridge sometimes also comprises a perforated support tube, usually known as a core, which is inserted internally of the tubular filter wall and fixed, at the ends, to the two plates.

In this way, the support core is able to oppose the deformations of the filter wall due to the fluid pressure peaks, as well as the vibrations, impacts and other like stresses.

In the prior art the water possibly present in the fuel to be filtered is separated from the fuel thanks to a hydrophobic wall which is located downstream of the filter wall, in the fuel flow direction. The separated water, due to having a greater specific weight than the fuel to be treated (for example diesel) tends to accumulate by force of gravity at the bottom of the beaker body, from where it is removed by means of known type.

A problem of known-type filter groups, in the case in which the fuel is diesel, is due to the formation of paraffins at low temperatures, which deposit on the surface of the filter wall and the hydrophobic wall, preventing the passage of fuel and therefore making it difficult to start the engine up from cold.

To obviate this drawback, the prior art contains the use of heating devices for heating the diesel internally of the cartridge so as to melt the paraffins and in this way to enable cold start-up of the engine.

The use of heating devices however increase costs and dimensions of the filter group, as well as complicating the design of the group.

An aim of the present invention is to disclose a filter group and a filter cartridge configured such as to obviate the above-mentioned drawbacks of the prior art, with a solution that is simple, rational and relatively inexpensive, while at the same time providing an advantageous alternative with respect to the above-described known systems described in the prior art.

The aims are attained by the characteristics of the invention as reported in the independent claims. The dependent claims delineate preferred and/or particularly advantageous aspects of the invention.

DESCRIPTION OF THE INVENTION

In particular the invention discloses a filter cartridge for filtering fuel comprising a filter wall having a tubular conformation, a first support plate fixed to an end of the filter wall and a second support plate fixed to the opposite end of the filter wall, a support core coaxially inserted internally of the filter wall and provided with radial openings for passage of the fuel, in which the support core exhibits, at an upper end thereof, a housing seating of a hydrophobic wall having a tubular shape which is positioned coaxially internally of the core, the hydrophobic wall comprising a support shank, configured such as to be housed in the housing seating and provided with a bypass conduit which enables placing an internal volume of the filter wall in fluid communication with an outlet hole afforded in the first support plate.

With this solution, in a case of paraffins forming and depositing on the surface of the hydrophobic wall, the diesel can bypass the hydrophobic wall by flowing through the bypass conduit.

In a further aspect thereof, the invention discloses a filter group comprising an external casing provided with an inlet for a fuel to be filtered, an outlet for the filtered fuel, and a filter cartridge, as described above, able to divide the internal volume of the casing into a first chamber communicating with the inlet and a second chamber communicating with the outlet.

BRIEF DESCRIPTION OF THE DRAWINGS

Further characteristics and advantages of the invention will emerge from a reading of the description that follows, provided by way of non-limiting example, with the aid of the figures of the accompanying tables.

FIG. 2 is a larger-scale section view of the filter cartridge of FIG. 1.

FIG. 6 is a larger-scale section view of a portion of FIG. 3.

BEST WAY OF CARRYING OUT THE INVENTION

Figure 1:
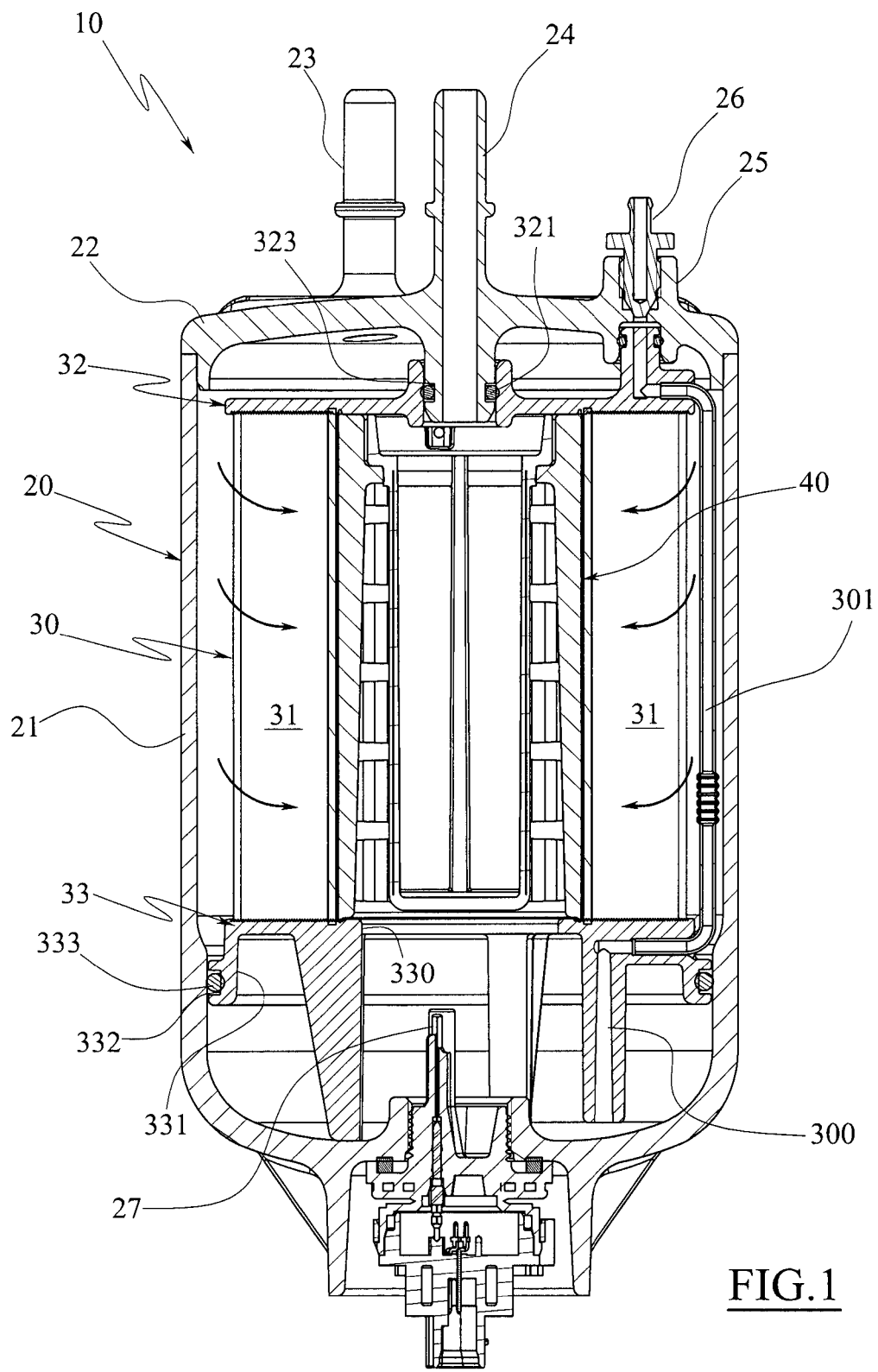
FIG. 1 is a section view of a filter group according to a first embodiment of the invention.

With particular reference to figures from 1 to 6, which illustrate a first embodiment of the invention, 10 denotes in its entirety a filter group of diesel for a diesel engine of a motor vehicle.

The filter group 10 comprises an external casing, denoted in its entirety by 20, which is formed by a beaker body 21 and by an upper cover 22 able to close the casing 20.

The cover 22 comprises an inlet conduit 23 for the diesel to be filtered, an outlet conduit 24 for the filtered diesel and a discharge conduit 25, provided with a suitable connecting cap 26, for the water accumulating on the bottom of the beaker body 21.

A level sensor 27 rises from the bottom of the beaker body 21, supported by a suitable stem, able to detect the level of the water which accumulates on the bottom of the beaker body 21 during the filtering of the diesel. The level sensor 27 is associated, as known to a technical expert in the sector, to an electronic control board (not illustrated) of the vehicle.

Alternatively, the sensor can be arranged on an electronic device fixable to the cover of the group and comprising a column insertable in the central cavity of the filter. In this case the detection probes of the separated water level can be incorporated in the support core of the filter means, in the support frame of the hydrophobic membrane and in the lower plate of the cartridge. The insertion of the column in the filter cavity enables obtaining an axial/radial prolongation of the sensor, thus characterised by a more compact structure.

A filter cartridge is housed internally of the housing 20, denoted in its entirety by number 30.

The filter cartridge 30 comprises a tubular filter wall 31, in the example a pleated wall, located between two disc-shaped support plates, generally made of plastic, of which an upper support plate 32 and a lower support plate 33, which are coaxially fixed to the opposite ends of the filter wall 31.

The lower support plate 33 closes the lower end of the filter wall 31 and is provided with a central hole 330, being a through-hole, from the edge of which a plurality of rest fins 34 branch, which have the function of maintaining the filter cartridge 30 in position internally of the beaker body 21.

Further, the lower support plate 33 comprises a lowered edge 331 provided with an annular seating 332 in which a first annular seal 333 is contained.

The first annular seal 333 can be compressed between the annular seating 332 and the internal wall of the beaker body 21, for example at a tapered zone thereof located in proximity of the bottom, so as to guarantee a hermetic seal between the lower support plate 33 and the beaker body 21.

The upper support plate 32 comprises a central hole 320 for coupling with the outlet conduit 24 which projects internally of the casing 20, by means of interposing of a second annular seal 321, positioned in an annular seating 323 realised on an external surface of the outlet conduit 24.

Further, the lower support plate 33 comprises a conduit 300 which opens in proximity of the bottom of the beaker body 21 and is connected by means of a cannula 301 to the water discharge conduit 25 for draining the water which collects on the bottom of the beaker body 21 during the functioning of the filter.

The filter wall 31 delimits an external volume, or "dirty side", that can be placed in communication with the inlet conduit 23 of the fuel to be filtered, and an internal volume, or "clean side", placed in communication with the outlet conduit 24.

A support core 40 is inserted internally of the filter wall and between the two plates 32 and 33, which exhibits an external diameter that is substantially smaller than the internal diameter of the filter wall 31, so that a space is defined between the internal surface of the filter wall 31 and the external surface of the support core 40.

With particular reference to figures from 2 to 5, the support core 40 comprises vertical ribbings 42, angularly spaced and joined to one another by a plurality of rings 43 which form, together with the vertical ribbings 42, a single reticular body which defines radial openings 44 for passage of the diesel. The upper and lower end of the support core are fixed, for example by means of an ultrasound welding (or infrared welding) respectively to the upper plate 32 and the lower plate 33.

Further, in the first embodiment of the invention, the support core 40 exhibits, in proximity of the upper edge, two vertical walls 45 (FIG. 5) externally coplanar to the external surface of the rings 43 and an internal annular abutment 46, located at the lower edge of the vertical walls 45.

The two vertical walls 45 and the internal annular abutment 46 define a housing seating 100 (FIG. 5) of a hydrophobic wall 50 having a tubular shape which is located coaxially internally of the support core 40 and which has the function of intercepting the water particles contained in the fuel.

Figure 4:
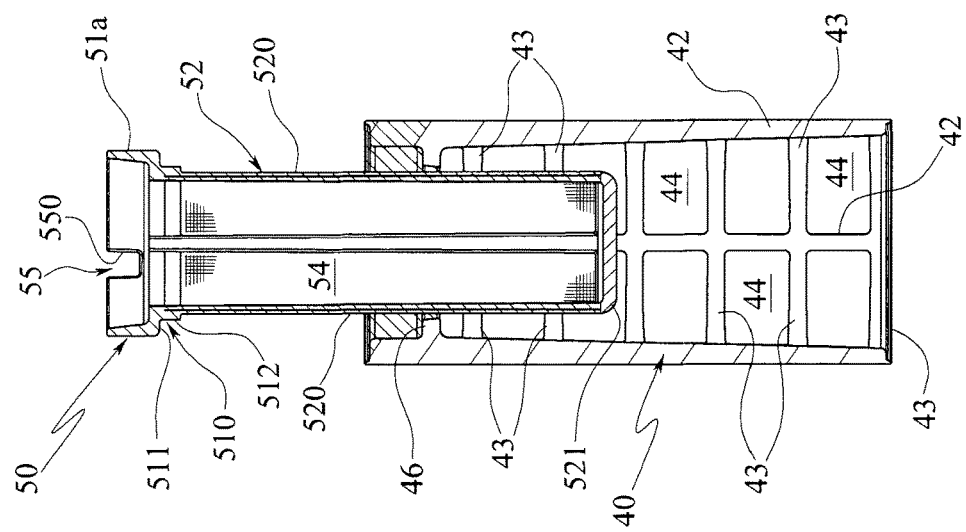
FIG. 4 is section IV-IV of FIG. 3.

In particular, the hydrophobic wall 50 comprises a support shank 51 of a hydrophobic net 54, cylindrical and coaxial to the core, which is associated to a frame 52 (FIG. 4) which branches from the support shank 51.

In greater detail the support shank, which exhibits an annular shape and is internally perforated, inferiorly supports the frame 52 which comprises four vertical rods 520 which develop internally of the core 40 in an axial direction, and the lower end of which is fixed to a closing base 521. The hydrophobic net 54 is fixed (for example by comoulding) to the vertical rods 520 of the frame 52, the technical characteristics of which hydrophobic net are known to the technical expert in the sector.

With reference to figures from 3 to 5, the shank 51 exhibits a vertical annular wall 51*a*, from which a step-conformed lower annular abutment 510 branches, which exhibits a horizontal portion 511 and a vertical portion 512.

In particular, when the hydrophobic net 50 is inserted internally of the support core 40, the shank 51 inserts in the housing seating 100 of the support core 40, and the horizontal portion 511 rests on a corresponding portion of the annular abutment 46, while the vertical portion 512 of the shank 51 inserts internally of a hole 460 delimited by the annular abutment 46.

The external diameter of the vertical portion 512 of the support shank 51 is slightly greater than the internal diameter of the internal housing hole 460 so that the vertical portion 512 is inserted in the hole by interference, guaranteeing the hermetic seal. In a different variant of the invention the hermetic seal can be guaranteed by other suitable seal means of known type, or by a special profile of the vertical portion 512 and/or of the surface of the internal hole 460. For example, the edge delimiting the internal wall of the internal hole 460 and/or the vertical wall of the lower annular abutment 510 can exhibit an appropriately-tapered conical profile, a lip/flap or an annular protrusion which radially branches towards the inside, with the aim of interacting with a corresponding profile provided on the vertical wall of the lower abutment so as to guarantee the hermetic coupling of the two elements without the aid of additional gaskets.

The shank 51 comprises at least a portion 55 of a bypass conduit which enables placing the internal volume in communication with the filter wall 31 with the hole 320 of the plate 32, and therefore with the outlet conduit 24 of the fuel.

Figure 3:
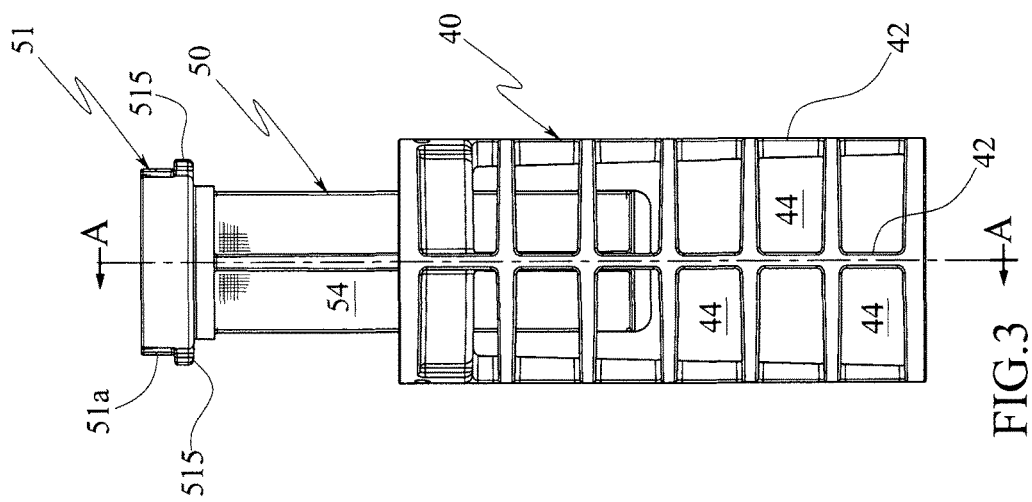
FIG. 3 is a lateral view of some components of the cartridge according to a first embodiment of the invention.

In the present embodiment the portion 55 of the bypass conduit present on the shank 51 comprises a groove 550 that is axially open at the upper edge of the shank 51 (FIG. 3).

In greater detail the present embodiment of the invention includes two grooves 550 which branch from the upper edge of the shank 51 and are angularly equidistanced from one another.

Figure 5:
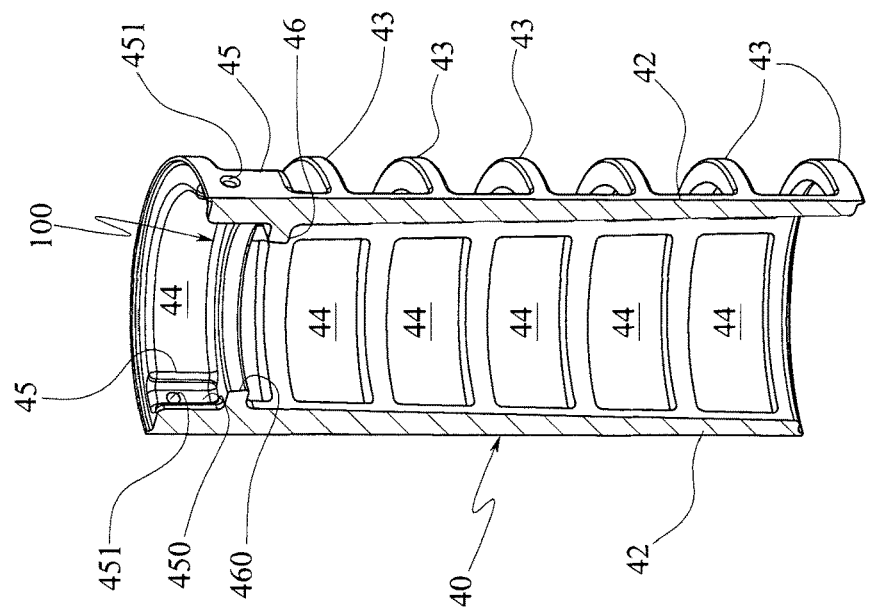
FIG. 5 is a perspective section view of one of the components of FIG. 3.

With reference to FIGS. 3, 5 and 6, at each groove 550 and below each groove the shank 51 is provided with an external tooth 515 able to insert in a corresponding recess 450 (FIG. 6) fashioned in an internal surface of the walls 45.

The presence of the teeth 515 and the respective receiving recesses 450 enable a rapid and quick positioning of the hydrophobic wall 50 internally of the core 40.

The wall 45 also exhibits a through-hole 451, which realises a second portion of bypass conduit, and which opens on a bottom wall of the recess 450 and places the internal volume of the filter wall, known as the clean side, in which the filtered diesel is located, with the corresponding portion 55 of the bypass conduit located on the shank 51, realized in the present embodiment by the grooves 550.

In the case of environmental conditions with severe temperatures, i.e. proximal to or lower than zero degrees Celsius, the paraffins which form internally of the filter group deposit on the hydrophobic net 54, preventing passage of the diesel through the hydrophobic net. In this case the diesel flows through the bypass conduit i.e. through the hole 451 present on the wall 45 of the core and the groove 550, enabling in this way the start-up of the engine. With the progressive heating of the diesel, and the consequent dissolution of the paraffins, the passage of fluid through this conduit becomes more disadvantageous since, in normal functioning conditions, it offers a resistance to passage of the fluid that is greater than the resistance offered by the hydrophobic separator.

Figure 7:
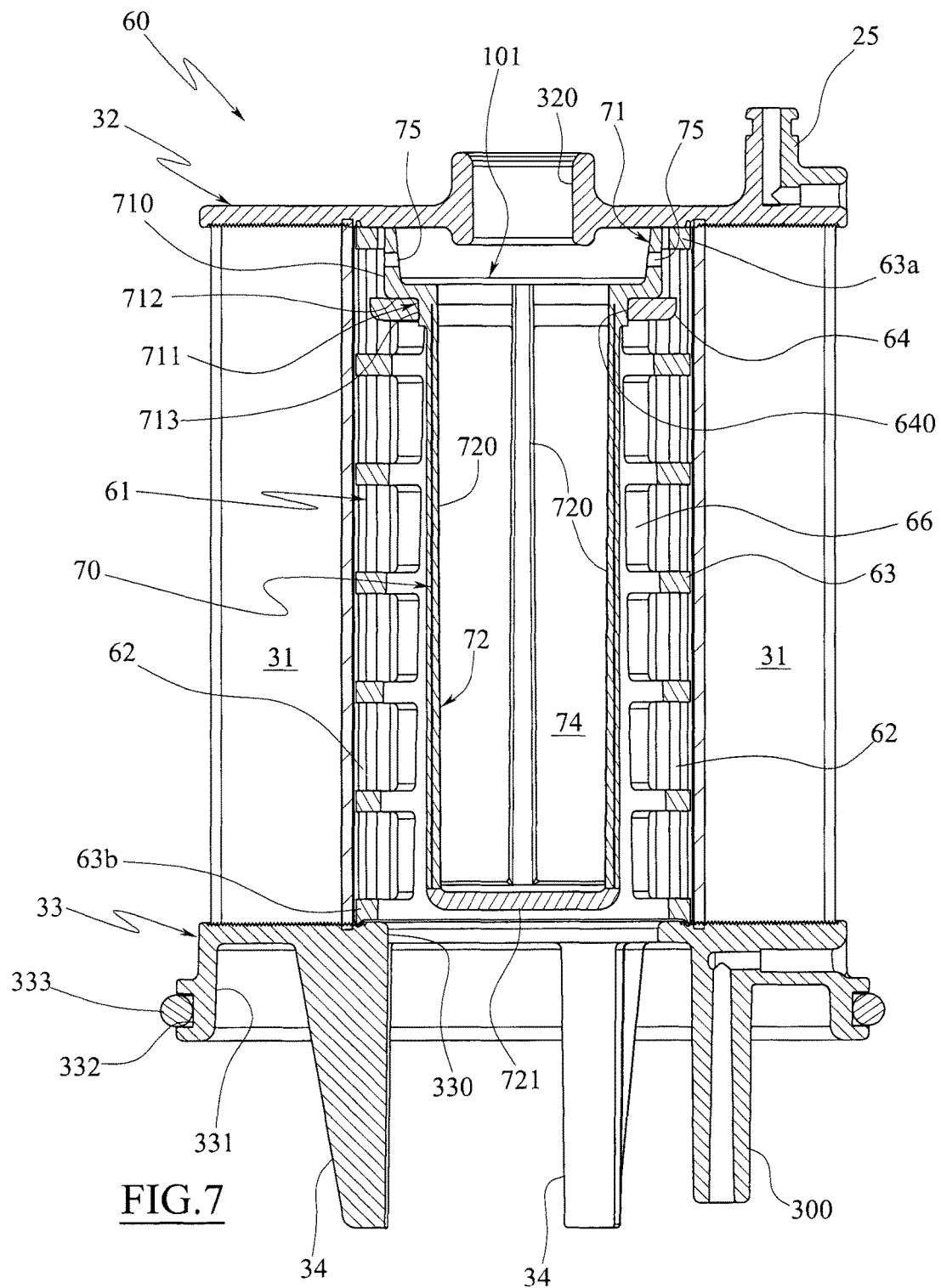
FIG. 7 is a section view of a second embodiment of a filter cartridge according to the invention.

FIG. 7 illustrates a second embodiment of the filter wall according to the invention. In describing the second embodiment of the invention the same reference numerals will be used for indicating identical components already previously described.

The second embodiment of the invention differs from the preceding embodiment described due to the fact that the bypass conduit is entirely realized in the shank of the hydrophobic wall, i.e. it comprises a single portion realized in the shank.

FIG. 7 illustrates a filter cartridge 60 which comprises the filter wall 31 located between the two plates 32 and 33, which are identical to the previously-described plates.

A support core 61 is housed internally of the wall 31, which support core 61 exhibits an external diameter which is substantially smaller than the internal diameter of the filter wall 31, so that a space is defined between the internal surface of the filter wall 31 and the external surface of the support core 61.

The support core 61 comprises vertical ribbings 62, angularly equidistanced, joined to one another by a plurality of rings 63, 63a and 63b, which form, together with the vertical ribbings 62, a reticular monolithic body, which defines radial openings 66 for passage of the diesel.

The rings 63a and 63b, which respectively realise the upper and lower end of the support core 61, are fixed respectively to the upper plate 32 and the lower plate 33.

The support core 61 further comprises an internal annular abutment 64 located between the ring 63a, which defines the upper end of the core 60, and the adjacent ring 63.

The upper ring 63a and the internal annular abutment 64 define a housing seating 101 of a hydrophobic wall 70, having a tubular shape, which is located coaxially internally of the support core 61 and having a function of intercepting the water particles contained in the fuel.

In particular, the hydrophobic wall 70 comprises a support shank 71 of a hydrophobic net 74 which is associated to a frame 72 which branches from the support shank 71.

In greater detail the support shank 71, which exhibits an annular shape and is internally perforated, inferiorly supports the frame 72 which comprises four vertical rods 720, which develop internally of the core 61 in an axial direction, and the lower end of which is fixed to a closing base 721. A hydrophobic net 74 is fixed (for example by comoulding) to the vertical rods 720 of the frame 72, which hydrophobic net 74 has a substantially cylindrical shape and the technical characteristics of which are known to a technical expert in the sector.

The core 71 comprises an upper annular wall 710 from which a lower annular abutment 711 branches, step-conformed and exhibiting a horizontal portion 712 and a vertical portion 713.

When the hydrophobic wall 70 is inserted internally of the support core 61, the shank 71 inserts in the housing seating 101 of the core, and the horizontal portion 712 rests on a corresponding horizontal portion of the annular abutment 64, while the vertical portion 713 of the shank 71 inserts internally of a hole 640 delimited by the annular abutment 64.

The external diameter of the vertical portion 713 of the support shank 71 is slightly greater than the internal diameter of the internal housing hole 640 so that the vertical portion 713 is inserted in the hole with interference, guaranteeing the hermetic seal. The shank 71 is provided with at least a bypass conduit 75 which enables placing the internal volume of the filter wall 31 in communication with the hole 320 present on the plate 32, and, when the cartridge is inserted in the filter group 10, with the outlet conduit 24 of the fuel.

In the present embodiment the shank 71 exhibits two bypass conduits 75, angularly equidistanced, each of which is realized by means of a calibrated through-hole realized in the shank 71, and in particular in the upper annular wall 710.

Some variants of the invention can include a different number of bypass conduits and/or a different arrangement in the support shank.

Figure 8:
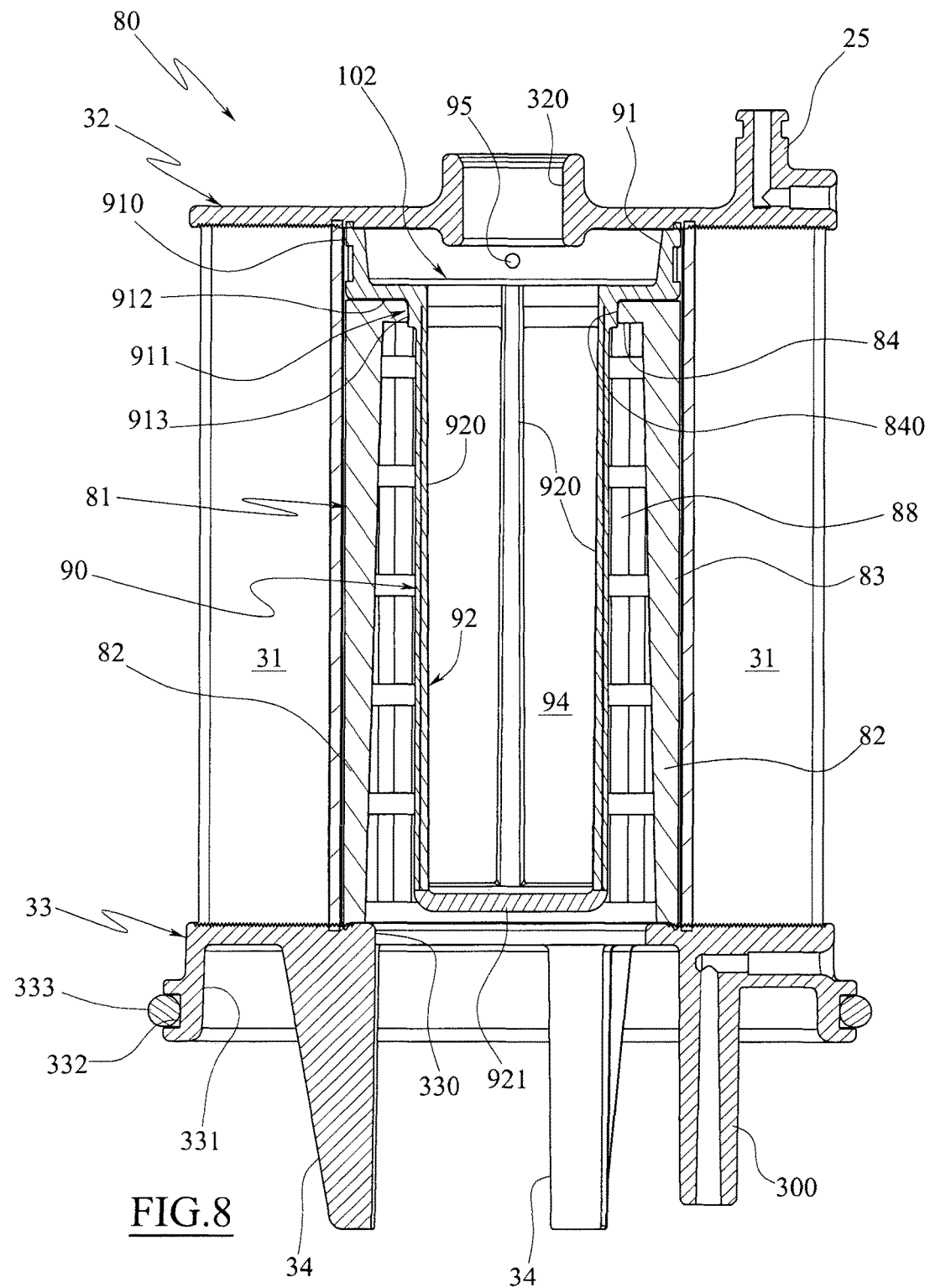
FIG. 8 is a section view of a third embodiment of a filter cartridge according to the invention.

FIG. 8 illustrates a third embodiment of the filter wall according to the invention. In describing the second embodiment of the invention the same reference numerals are used to indicate identical components that have already been described in the foregoing.

The third embodiment of the cartridge according to the invention differs from the first embodiment described due to the fact that the bypass conduit is entirely realised in the shank, i.e. it comprises a single portion realized in the shank.

FIG. 8 illustrates a filter cartridge 80 which comprises the filter wall 31 located between the two plates 32 and 33, which are identical to the previously-described plates.

A support core 81 is housed internally of the wall 31, which support core 81 exhibits an external diameter that is substantially smaller than the internal diameter of the filter wall 31, so that a space is defined between the internal surface of the filter wall 31 and the external surface of the support core 81.

In the present embodiment the support core 81 is fixed only to the lower plate 33 and has a height that is lower than the height of the filter wall 31.

The support core 81 comprises vertical ribbings 82, angularly equidistanced, joined to one another by a plurality of rings 83 which form, together with the vertical ribbings 82, a net-conformed monolithic body which defines radial openings 88 for passage of the diesel fuel.

The support core 81 further comprises an annular abutment 84 facing internally and located at the upper end of the support core 81.

The annular abutment 84 defines a housing seating 102 of a tubular hydrophobic wall 90, which is located coaxially internally of the support core 81, and which has the function of intercepting the water particles contained in the fuel.

In particular, the hydrophobic wall 90 comprises a support shank 91 of a hydrophobic net 94 which is associated to a frame 92 which branches from the support shank 91.

In greater detail the support shank, which exhibits an annular shape and is internally perforated, supports the frame 92 which comprises four vertical rods 920, which develop internally of the core 81 in an axial direction, and the lower end of which is fixed to a closing base 921. A hydrophobic net 94, having a substantially cylindrical shape and the technical characteristics of which are known to a technical expert in the sector, is fixed to the frame 92, and in particular to the vertical rods 920.

The shank 91 comprises an upper annular wall 910 from which a step-formed lower annular abutment 911 branches, which lower annular abutment 911 exhibits a horizontal portion 912 and a vertical portion 913.

In particular, when the hydrophobic wall 90 is inserted internally of the support core 81 the shank 91 inserts in the housing seating 102 of the core, and the horizontal portion 912 rests on the upper edge of the support core 81, i.e. on the annular abutment 84, while the vertical portion 913 of the shank 91 inserts internally of a hole 840, delimited by the annular abutment 84.

The upper annular wall 910 of the shank 91 is therefore located between the lower surface of the upper plate 32 and the edge of the core. With this configuration the core 91 contributes, together with the core, to giving a greater mechanical resistance to the filter cartridge.

It is further specified that the external diameter of the vertical portion 913 of the support shank 91 is slightly greater than the internal diameter of the internal housing hole 840 so that the vertical portion 913 is inserted in the hole with interference.

The shank 91 is provided with at least a bypass conduit 95 which enables placing the internal volume 31 of the filter wall 31 with the hole 320 present on the plate, and when the cartridge is inserted in the filter group 10, with the outlet conduit 24 of the fuel.

In the present embodiment the shank 91 exhibits two bypass conduits 75, angularly equidistanced, each of which is realised with a calibrated through-hole realized in the shank 71, and in particular in the upper annular wall 910.

All the embodiments of the invention advantageously include the bypass conduit being located in proximity of the outlet hole 320 of the fuel. The position of the bypass conduit is advantageous as it reduces the probability that the water particles contained in the fuel flow through the bypass conduit. The water particles, in fact, being heavier than the diesel oil, naturally tend to deposit on the bottom of the container 21.

The invention as it is conceived is susceptible to numerous modifications and variants, all falling within the scope of the inventive concept.

Further, all the details can be replaced by other technically-equivalent elements.

In practice, the materials used, as well as the contingent shapes and dimensions, can be any according to requirements, without forsaking the scope of protection of the following claims.

The invention claimed is:

1. A filter cartridge (30) for filtering fuel comprising: a filter wall (31) having a tubular conformation, a first support plate (32) fixed to an end of the filter wall (31) and a second support plate (33) fixed to the opposite end of the filter wall, a support core (40, 61, 81) coaxially inserted internally of the filter wall (31) and provided with radial openings (44, 66, 88) for passage of the fuel, the support core (40, 61, 81) comprising, at an end thereof, a housing seating (100, 101, 102) of a hydrophobic wall (50, 70, 90) having a tubular shape which is positioned coaxially internally of the core, the hydrophobic wall (50, 70, 90) comprising a support shank (51, 71, 91), configured to be housed in the housing seating (100, 101, 102) and provided with at least a portion (55, 75, 95) of a bypass conduit which enables placing an internal volume of the filter wall (31) in fluid communication with an outlet hole (320) arranged in the first support plate (32), wherein the housing seating (100, 101, 102) comprises at least an annular abutment (46, 64, 84) which defines an internal hole (460, 640, 840) for housing a vertical portion (512, 713, 913) of the support shank (51, 71, 91).

2. The cartridge of claim 1, wherein the bypass conduit comprises a single portion (75, 95) made in the shank (71, 91).

3. The cartridge of claim 1, wherein the support shank (51, 71, 91) of the hydrophobic wall (50, 70, 90) is hermetically fixed at the internal surface of the internal hole (460, 640, 840).

4. The cartridge of claim 1, wherein the support shank (51, 71, 91) of the hydrophobic wall (50, 70, 90) is hermetically fixed by interference at the internal surface of the internal hole (460, 640, 840).

5. The cartridge of claim 1, wherein the housing seating (100) further comprises at least a lateral wall (45) provided with at least a recess (450) adapted to house a corresponding tooth (515) which branches externally of the support shank (51).

6. The cartridge of claim 5, wherein a wall of the recess (450) comprises a through-hole (451), the tooth (515) being axially aligned with the portion (55) of the bypass conduit present on the support shank (51).

7. The cartridge of claim 5, wherein the portion (55) of the bypass conduit present on the shank (51) comprises a groove (550) axially open at the upper edge of the support shank (51).

8. The cartridge of claim 1, wherein the support shank (51, 71, 91) comprises an upper annular wall (51, 710, 910) from which a step-conformed lower annular abutment (510, 711, 911) branches, which comprises a horizontal portion (511, 712, 912) and a vertical portion (512, 713, 913).

9. The cartridge of claim 2, wherein the support core (81) has a lower height than the filter wall (31) and the horizontal portion (912) rests on the upper edge of the support core (81).

10. The cartridge of claim 1, wherein the support shank (51, 71, 91) comprises two angularly-spaced bypass conduits (55, 75, 95) which enables placing an internal volume of the filter wall (31) in fluid communication with an outlet hole (320) arranged in the first support plate (32).

11. The cartridge of claim 1, wherein the hydrophobic wall (50, 70, 90) comprises a hydrophobic net (54, 74, 94) fixed about a frame (52, 72, 92) which branches from the support shank (51, 71, 91).

12. A filter group (10) comprising an external casing (20) provided with an inlet (23) for a fuel to be filtered, an outlet (24) for the filtered fuel, and a filter cartridge (30, 60, 80), according to claim 1, adapted to divide the internal volume of the casing (20) into a first chamber communicating with the inlet (23) and a second chamber communicating with the outlet (24).

* * * * *